United States Patent Office 2,731,311
Patented Jan. 17, 1956

2,731,311
ANTIFRICTION BEARING
Leo A. Schwartz, Oklahoma City, Okla.

Application May 20, 1954, Serial No. 431,080

3 Claims. (Cl. 308—191)

This invention relates to ball bearings, and is particularly concerned with improvements in ball bearings for anti-friction applications, such as grocery and hospital carts, conveyors and the like, in which there is need for small, anti-friction bearings of great endurance, and the need of lubrication for the bearings while in use is automatically provided.

Devices now available for use under such requirements have many disadvantages in that the bearing surface afforded is usually a small shoulder on each side of the bearing hub causing a frequent loosening in the wheel and resulting in the loss of the antifriction qualities of the bearing. Also, many present day devices of this type must be lubricated at intervals during their usage to maintain an efficient operation. This application of lubricants inevitably results in spillage on the wheel damaging the rubber wheel, and such spillage of grease or oil causes deterioration of the rubber where the wheel can least afford it, as well as affording opportunity for accidents by slipping on the grease stained floor.

The present invention contemplates a ball bearing having sleeves forming a large diameter bearing surface, thereby reducing the force per unit of area on the rubber wheel around the bearing, and thus eliminating the possibility of the bearing losing its anti-friction feature. The bearing is also constructed with an adequate, lifetime lubricant reservoir which is completely sealed to prevent the loss of any grease or oil from the reservoir. The improved bearing is made in two individual, permanently sealed elements which are fitted together such that the bearing may be assembled into the wheel either before or after molding.

An important object of this invention is to provide a bearing which will maintain proper lubrication throughout the life of the bearing.

Another object of this invention is to provide a self-lubricating bearing which is adequately sealed so as to prevent any possibility of leakage of the lubricant onto the wheel.

A further object of this invention is to provide a bearing which affords a rigid, large diameter bearing surface against the wheel for continuous ease of operation.

A still further object of this invention is to provide a bearing which may be assembled into a wheel either before or after molding.

And a still further object is to provide a bearing which is simple and inexpensive to construct and easy and durable in operation.

Other objects and advantages of the invention will be evident from the following detailed description, read in conjunction with the accompanying drawings, which illustrate my invention.

Figure 1:
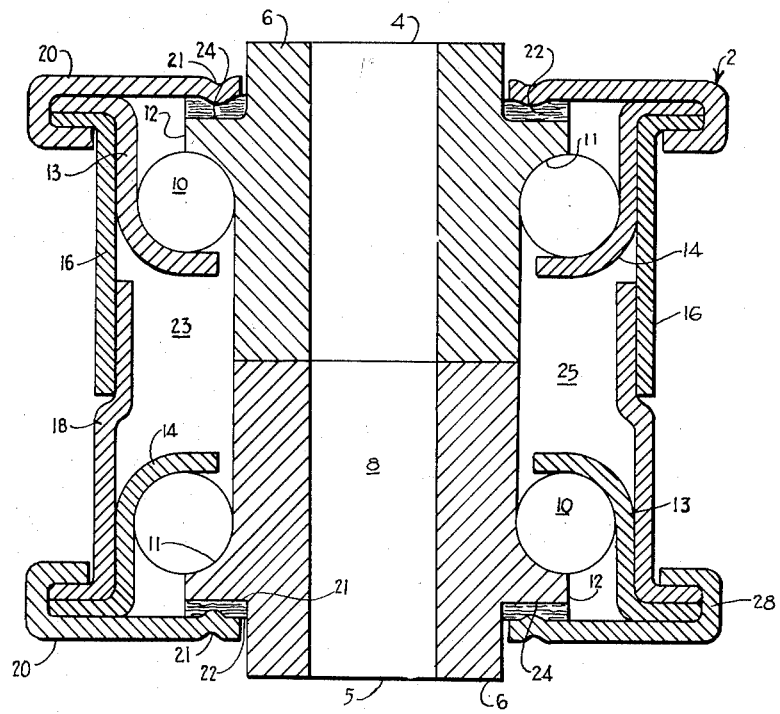
Figure 1 is a cross sectional view taken through the longitudinal center line of a bearing embodying the invention.

Referring to the drawings in detail, reference character 2 represents the bearing in general, which is comprised of two individual upper and lower body elements 4 and 5 respectively and of cylindrical configuration. Each of the individual elements 4 and 5 are rigidly and permanently assembled, and are constructed in the following manner: A hardened inner race 6, which is preferably circular in cross section, is provided with an aperture 8 for the insertion of a stationary shaft or axle (not shown) utilized with the perambulator or small truck. A plurality of hardened balls 10 are arranged around the outer periphery of the inner race 6, against the radius 11 on the shoulder 12. The balls 10 are held in place by the hardened outer race 13 having a curved flange portion 14 complementary to the balls 10. An outer sleeve 16 is positioned against the outer race 13 in the upper section 4 (Fig. 1) and in a like manner, an inner sleeve 18 is positioned against the outer race 13 in the lower section 5 (Fig. 1). A gasket 22 is disposed on the substantially flat face 24 of the shoulder 12 adjacent the outer periphery of the inner race 6. A cup shaped closure member 20 is provided over the flanges of the sleeves 16 and 18, and the outer race 13. The cup 20 is crimped at 21 into the gasket 22 thereby assuring a completely adequate seal, and preventing any leakage of the lubricants normally contained in the chambers 23 and 25.

The outside diameter of the inner sleeve 18 is made to fit snugly against the inside diameter of the outer sleeve 16 to prevent leakage of the lubricants from the chambers. The two separate, individually assembled sections, each containing the sealing gasket 22 interposed between the cup 20 and the inner race 6, are then ready to be pressed together, with the inner sleeve 18 sliding into position against the outer sleeve 16, forming the chambers 23 and 25 for storing a lifetime supply of lubricant, said lubricant being inserted before assembly of the two sections.

Figure 2:
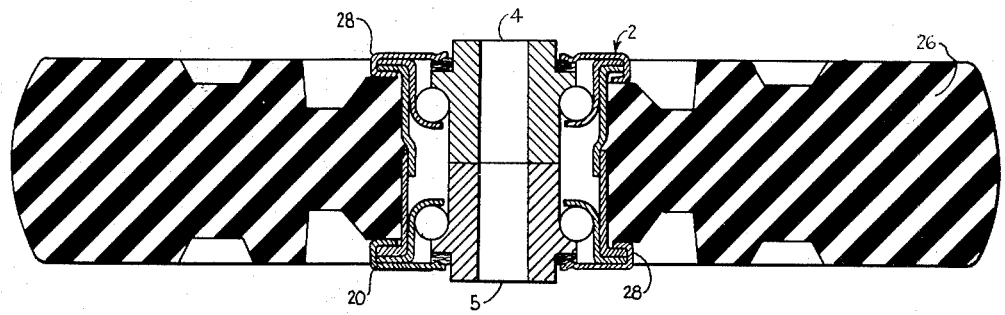
Figure 2 is a cross sectional view of the improved bearing showing a wheel attached, and disposed in a horizontal position.

From Fig. 2 it can be seen that a wheel 26, usually constructed of rubber or other molded material, but not limited thereto, is held firmly in alignment and in place by the tubular sleeves 16 and 18 and the flanges 28 of the cup 20. The wheel 26 is usually constructed of rubber, but is not limited thereto. The rigid and large diameter of the bearing surface formed when the sleeves 16 and 18 are pressed together provides the anti-friction action of the bearing 2 against the wheel 26. It is also apparent that the two sections 4 and 5 may be pressed together either before or after securing the bearing to the wheel 26, and it is also possible to force the sleeves 16 and 18 apart to remove the bearing 2 from the wheel 26 when necessary to so do.

From the foregoing, it is apparent that the present invention contemplates a bearing unit adapted to be utilized with a wheel or rotatable member of any suitable type, wherein the anti-friction action of the bearing is improved, and the maintenance of an adequate supply of lubrication is assured for the life of the bearing. Furthermore, the bearing may be assembled for easy assembly with the wheel or rotatable member.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. In an anti-friction ball bearing unit for utilization with a wheel comprising a pair of upper and lower aligned sleeve members providing an inner race member adapted for use on a wheel axle, each sleeve member having a shoulder provided with a curved groove therein, a plurality of balls disposed in each groove, a bent flange portion disposed adjacent the balls forming an outer race member for the sleeves, a storage chamber between the upper and lower outer race members for receiving lubricant, a pair of outer sleeve members maintained in a tight fitting relationship for the outer race members and adapted to receive the wheel, and cover means cooperating between the first mentioned sleeve members and the outer sleeve members for holding them in unitary relationship, said cover means providing a pair of outwardly extending shoulders adapted to retain the wheel therebetween.

2. In a ball bearing unit for utilization with a wheel comprising a pair of upper and lower aligned sleeve members providing an inner race member adapted for use on a wheel axle or the like, each sleeve member having a shoulder provided with a curved groove therein, a plurality of balls disposed in each groove, a bent flange portion disposed adjacent the balls forming a pair of outer race members, a storage chamber between the upper and lower outer race members for receiving lubricant, a pair of outer sleeve members maintained in tight fitting relationship for the outer race members and adapted to receive the wheel, cover means cooperating between the first mentioned sleeve members and the outer sleeve members for holding them in unitary relationship, said cover means providing a pair of outwardly extending shoulders adapted to retain the wheel therebetween, and a lubricant seal disposed between the cover means and the shoulders.

3. In a ball bearing unit for utilization with a molded wheel comprising a sectional sleeve member having aligned apertures providing an inner race member, an outwardly extending shoulder having a curved groove portion on one side thereof, a plurality of balls disposed in the groove, outer race means having a curved flange portion disposed adjacent the balls for maintaining them in the groove, sleeve means for maintaining the outer race in position against the balls, said sleeve means comprising a pair of overlapping cylinders adapted to permit insertion of the bearing unit within the molded wheel, a lubricant chamber provided by the sleeve means to preclude contamination of the wheel by lubricants, and cover means providing leak-proof operation of the unit.

References Cited in the file of this patent

UNITED STATES PATENTS

| | | |
|---|---|---|
| 859,099 | Nice | July 2, 1907 |
| 1,580,920 | Roe | Apr. 13, 1926 |
| 1,749,502 | Nielsen | Mar. 4, 1930 |
| 2,136,531 | Vogt | Nov. 15, 1938 |
| 2,221,553 | Okun | Nov. 12, 1940 |
| 2,622,934 | Phelps | Dec. 23, 1952 |
| 2,643,917 | Douglas et al. | June 30, 1953 |
| 2,655,392 | Lighthall | Oct. 13, 1953 |